(12) United States Patent
Gupta

(10) Patent No.: US 10,140,267 B1
(45) Date of Patent: Nov. 27, 2018

(54) EFFICIENT OPERATION OF GRC PROCESSING PLATFORMS

(71) Applicant: EMC Corporation, Hopkinton, MA (US)

(72) Inventor: Rohit Gupta, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 393 days.

(21) Appl. No.: 14/980,252

(22) Filed: Dec. 28, 2015

(51) Int. Cl.
*G06F 7/02* (2006.01)
*G06F 17/30* (2006.01)
*G06F 17/22* (2006.01)

(52) U.S. Cl.
CPC ...... *G06F 17/227* (2013.01); *G06F 17/30082* (2013.01); *G06F 17/30569* (2013.01)

(58) Field of Classification Search
CPC ......... G06F 17/30082; G06F 17/30085; G06F 17/30861; H04L 67/2823; H04L 41/0226
See application file for complete search history.

(56) References Cited

U.S. PATENT DOCUMENTS

| | | | | |
|---|---|---|---|---|
| 7,315,903 B1 * | 1/2008 | Bowden | .............. | H04L 41/0886 709/224 |
| 9,852,138 B2 * | 12/2017 | Todd | ................. | G06F 17/30082 |
| 2013/0117847 A1 * | 5/2013 | Friedman | .............. | H04L 63/102 726/22 |
| 2014/0164249 A1 | 6/2014 | Guerrino et al. | | |
| 2015/0163206 A1 * | 6/2015 | McCarthy | ........... | G06F 21/6227 713/171 |

OTHER PUBLICATIONS

"Operational Risk Management: A Guide to Harness Risk With Enterprise GRC"; 10 pages.

* cited by examiner

*Primary Examiner* — Bruce M Moser
(74) *Attorney, Agent, or Firm* — BainwoodHuang

(57) ABSTRACT

Techniques of operating a GRC processing platform involve terminating retrieval activity in a data source when the data source indicates that there is no data to be obtained that satisfies a specified logical condition. Along these lines, a user of the GRC processing platform provides instructions to retrieve data from an external data source. As part of the data retrieval, the GRC processing platform accesses data from the external source and transforms the data from a first format (e.g., XML) to a second format (e.g., XML) appropriate for an application that runs on the GRC processing platform. After the transformation, the GRC processing platform receives an indication that the transformed data satisfies a logical condition indicating that the data being retrieved is not desired for the application. In this case, the GRC processing platform terminates the data retrieval.

9 Claims, 3 Drawing Sheets

EFFICIENT OPERATION OF GRC PROCESSING PLATFORMS

BACKGROUND

Governance, risk management, and compliance (GRC) is a field that aims to synchronize information and activity across an enterprise in order for the enterprise to operate more efficiently, to enable effective information sharing, to report activities more effectively, and to avoid wasteful duplication of effort. Processing platforms such as RSA® Archer™ GRC Platform allow businesses and other entities to build custom applications and integrate external systems. Such a platform works by obtaining data from a set of external data sources and converting the data into a format compatible with an application within the platform. The application can then use the converted data to build reports, manage policies and/or GRC rules, and update GRC databases.

SUMMARY

Unfortunately, there are deficiencies with the above-described conventional approach to operating a GRC processing platform. For example, external data sources provide data to applications running within the processing platform according to a set of rules, e.g., periodically and at a set time each day. This means that processing platform expends processing resources in retrieving data from a data source, even under conditions in which the data retrieved is rejected and not processed by the processing platform.

In contrast with the above-described conventional approach, improved techniques of operating a GRC processing platform involves terminating retrieval activity from a data source when the data source indicates that there is no data to be obtained that satisfies a specified logical condition. Along these lines, a user of the GRC processing platform provides instructions to retrieve data from an external data source. As part of the data retrieval, the GRC processing platform accesses data from the external source and transforms the data from a first format (e.g., XML) to a second format (e.g., XML) appropriate for an application that runs on the GRC processing platform. After the transformation, the GRC processing platform receives an indication that the transformed data satisfies a logical condition indicating that the data being retrieved is not appropriate for the application. In this case, the GRC processing platform terminates the data retrieval. In this way, the improved techniques allow a GRC processing platform to run more efficiently.

One embodiment of the improved techniques is directed to a method of operating a GRC processing platform that runs a GRC application. The method includes initiating, by processing circuitry of the GRC processing platform, a retrieval of data from an external data source according to a set of GRC rules, the data being expressed in a first format. The method also includes performing, by the processing circuitry, a transformation operation on the data expressed in the first format to produce transformed data, the transformed data including the data expressed in a second format distinct from the first format, the second format providing parameters having values to be provided as input into the GRC application after retrieval of the data is complete. The method further includes receiving, by the processing circuitry, an indication that the transformed data satisfies a logical condition specified in the set of GRC rules. The method further includes, in response to receiving the indication, terminating, by the processing circuitry, the retrieval of data from the external data source, thereby improving operation of the processing platform by ceasing further processing of data that will not be input into the GRC application.

Additionally, some embodiments of the improved techniques are directed to a GRC processing platform constructed and arranged to run a GRC application. The system includes memory and controlling circuitry constructed and arranged to carry out the method of operating the GRC processing platform.

Further, some embodiments of the improved techniques are directed to a computer program product having a non-transitory computer readable storage medium that stores instructions which, when executed by a GRC processing platform, cause the GRC processing platform to carry out the method of operating the GRC processing platform.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of operating a GRC processing platform involve terminating retrieval activity in a data source when the data source indicates that there is no data to be obtained that satisfies a specified logical condition. In this way, the improved techniques allow a GRC processing platform to run more efficiently.

Figure 1:
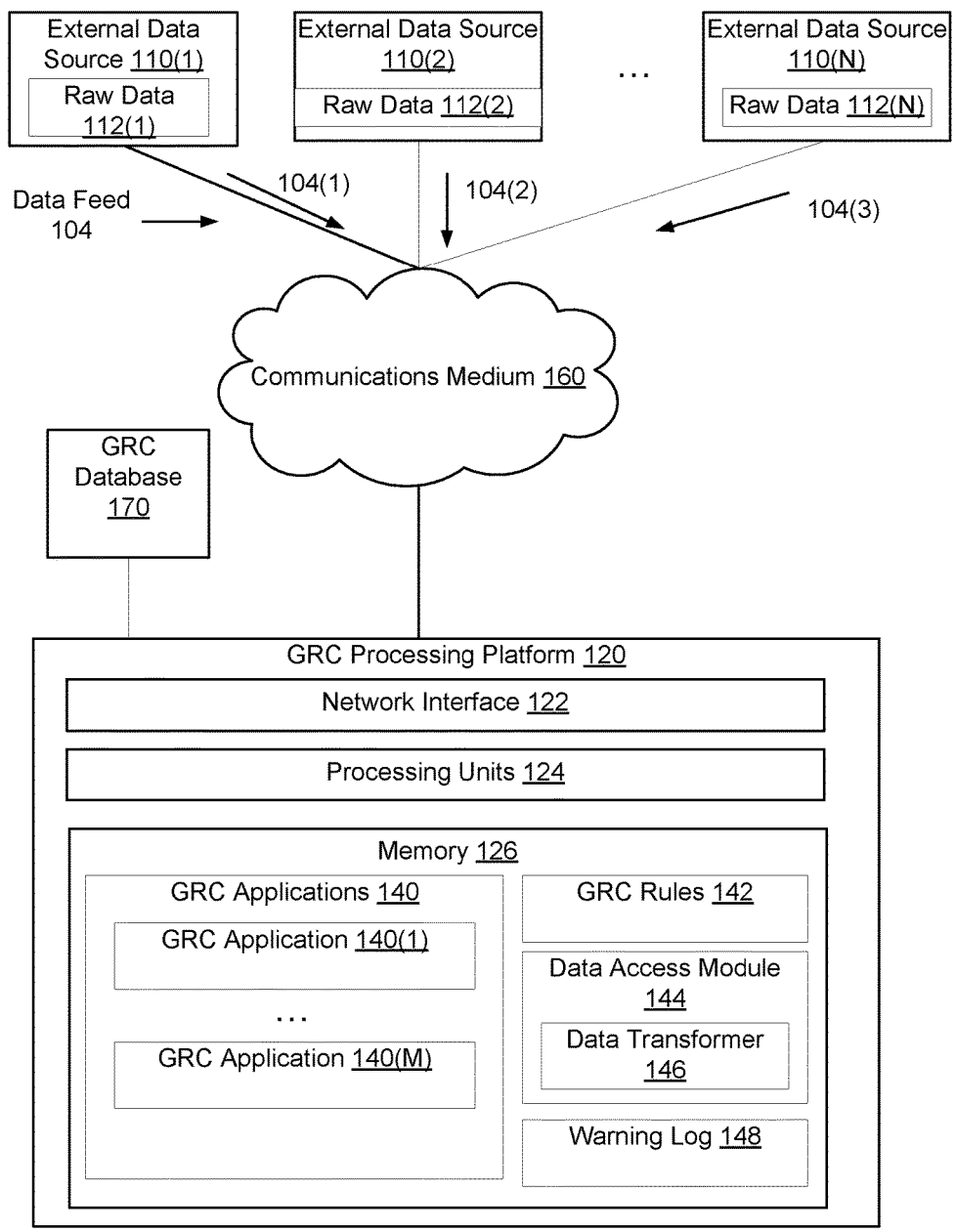
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes a set of external data sources 110(1), 110(2), . . . , 110(N), a governance, risk management, and compliance (GRC) processing platform 120, a communications medium 160, and a GRC database 170.

Each of the external data sources 110(1), 110(2), . . . , 110(N) is a computer system configured to generate the data that will eventually be used by one or more applications running on the GRC processing platform 120. For example, the external data source 110(1) may take the form of a security incident and event management (SIEM) system that provides alerts for any incidents occurring on a network that satisfy a set of rules. Meanwhile, the external data source 110(2) may take the form of a database of employee requests to access resources. It should be understood that the SIEM system and the database may each store data in different formats, e.g., compatible with different XML documents. Generally, the external data sources 110(1), 110(2), . . . , 110(N) produce and store data in different formats, and these formats may not be compatible with applications running on the GRC processing platform.

The GRC processing platform 120 is configured to run GRC applications 140 that perform reporting and information sharing as part of GRC functions of an organization. Part of running the GRC applications 140 is retrieving data from the external data sources 110(1), 110(2), . . . , 110(N) for input into the GRC applications 140. The GRC processing platform 120 typically takes the form of a set of server computers accessible to users either directly or via hosts over the communications medium 160.

The GRC processing platform 120 is seen to include one or more network interfaces 122, a set of processing units 124, and memory 126. The network interfaces 122 include, for example, Ethernet adapters, Token Ring adapters, and the like, for converting electronic and/or optical signals received from the communications medium 160 to electronic form for use by the GRC processing platform 120. The set of processing units 124 include one or more processing chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as the GRC applications 140 and a data access module 144. The data access module 144 includes a data transformer 146. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example. The memory 126 is also constructed and arranged to store various data such as sets of GRC rules 142 and a data log 148.

In an example, the GRC applications 140 are custom applications configured to produce reports, provide real-time monitoring of organizational functions, and the like according to specifications of a user of the GRC processing platform. Each GRC application 140 may combine data from different external data sources 110(1), . . . , 110(N) to produce a single report or monitor. For example, GRC application 140(1) may produce reports of employee network activity in violation of corporate risk management guidelines. Such reports may take in data from the SIEM system 110(1) and employee access database 110(2).

The data access module 144 is configured to access each of the external data sources 110(1), . . . , 110(N) over the communications medium 160. In some arrangements, the data access module 144 accesses each of the external data sources 110(1), . . . , 110(N) at various, predetermined times according to user preference. The data access module 144 may access all new data from an external data source, e.g., 110(1) at a given time, or it may access the data over a set period of time, e.g., 1 hour. During the time when the data access module 144 is accessing an external data source 110(1), the data access module 144 is configured to construct a data feed 104(1) over which data flows to the GRC processing platform 120.

However, it should be understood that the data produced at the different external data sources 110(1), . . . , 110(N) are typically not in a format appropriate for input into the GRC applications 140. For example, data produced by the SIEM application 110(1) may store such data in a particular XML format, while the GRC application 140(1) requires data in another XML format. Further, the employee access database 110(2) may provide data in another format, e.g., CSV, SQL, and the like.

Accordingly, the data access module 144 includes a data transformer 146 that is configured to transform raw data stored at an external data source 110(1), 110(2), . . . , 110(N) in a first format to data in a second format appropriate for input to a GRC application 140. For example, the data transformer 146 is configured to convert SIEM data in an XML format to alert data in another XML format. In the examples presented herein, the data transformer 146 is encoded as extensible stylesheet language (XSL) transformations.

The data access module 144 is further configured to terminate a data feed 104 when data transformed by the data transformer 146 satisfies specified logical condition. For example, suppose that that the GRC rules 142 specify that the GRC application 140(1) requires the specification of a particular business unit, such as "accounting" in its input; otherwise the GRC application 140(1) is not allowed to produce any reports. In this case, if upon conversion the data transformer 146 finds that there is no business unit labeled "accounting" then data access module 144 is configured to terminate the data feed 104.

The data warning log 148 is configured to store warnings generated when the data access module 144 terminates a data feed. The data warning log 148 is typically stored as an XML file.

The communications medium 160 provides network connections between the external data sources 110(1), . . . , 110(N) and the GRC processing platform 120. The communications medium 160 may implement any of a variety of protocols and topologies that are in common use for communications over the Internet or other networks. Further, the communications medium 160 may include various components (e.g., cables, switches/routers, gateways/bridges, etc.) that are used in such communications.

The GRC database 170 includes a storage device storing data used by the GRC applications 140. The data in the GRC database is typically in a format for input into the GRC applications 140, i.e., the data been converted by the data transformer 146 to such a format.

During an example operation, the GRC processing platform 120 initiates data retrieval from an external data source, e.g., 120(1). For example, the GRC processing platform 120 is configured to initiate the retrieval at a certain time of the day. Alternatively, the GRC processing platform 120 may be configured to initiate the retrieval in response to an event such as a network breach.

In response, the data access module 144 accesses the external data source 110(1) through the communications medium 160. For example, the data access module 144 may send a TCP/IP data packet that identifies the GRC processing platform 120 as an entity that is authorized to access the data produced and stored at the external data source 110(1). In response, the external data source 110(1) would send an acknowledgment packet to the GRC processing platform 120, after which the data access module 144 would set up a data feed 104 over a communication channel through the communications medium 160.

Upon setting up the data feed, the data transformer 146 begins converting data at the external data source 110(1) to a specified format. For example, the XSL transformation in which the data transformer 146 may specify that the data in a first XML format be converted to a second XML format.

Specifically, the second XML format might have a separate Business Unit field, while the first XML format does not.

Further, the data transformer 146 also has code within the XSL transformation that looks for a particular logical condition, e.g., that there is a particular value of the business unit ("accounting" for the purposes of discussion herein). The logical condition may be expressed in the set of GRC rules 142. For example, the first XML format may simply have names and IP addresses in separate fields. However, the XSL may have encoded a mapping from IP addresses to business units (which it may have obtained from another data feed). In this case, the data transformer 146 produces business unit data from the raw XML data at the external data source 110(1).

Once the data transformer 146 has converted the raw XML data in the first format at the external data source 110(1) to the second XML format that includes the business unit data, the data transformer 146 checks the GRC rules 142 and obtains logical conditions that the transformed data needs to obey. The data transformer then checks the transformed data in the second XML format to see whether any of the logical conditions of the GRC rules 142 may preclude the data retrieval from proceeding. In the above example, if there are no data having a business unit="accounting" then the data access module 144 terminates the data feed.

It should be understood that an XSL transformation may terminate the data feed 104 by throwing an error condition using the command "<xsl:message terminate='yes'>". However, instead of allowing such a thrown error condition to persist into a log, the data transformer 146 suppresses an error message generated by the XSL transform and writes the message in the warning log 148 as a warning rather than an error. In this way, the data access module 144 is not precluded from retrieving data from other external data sources 110(2), . . . , 110(N) because the error message has been intercepted from STDERR.

Figure 2:
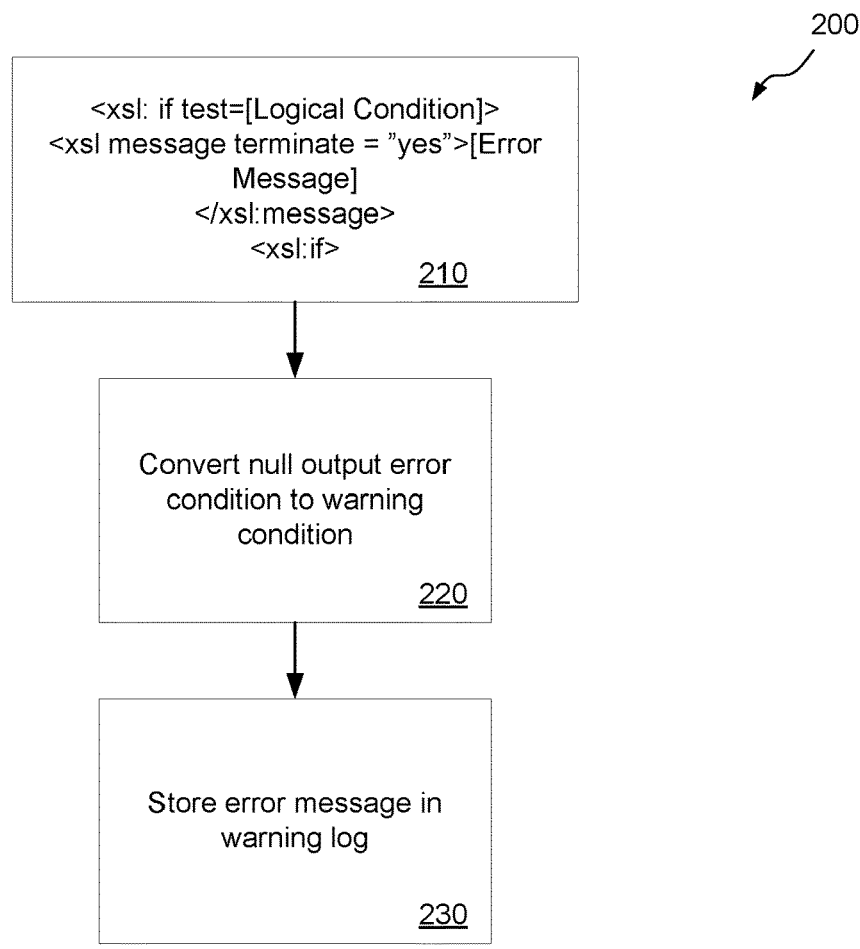
FIG. 2 is a flow chart illustrating an example data retrieval termination within the electronic environment shown in FIG. 1.

FIG. 2 shows an example process 200 of terminating a data feed. At 210, after the transformed data satisfies a logical condition (e.g., no data having a business unit value="accounting"), the data transformer 146 executes XSL transform code that throws an error condition terminating the data feed. The XSL transform code takes the form shown in FIG. 2 at 210. The command "message terminate='yes'" terminates the data feed 104 and the retrieval process and nominally sends a null output to STDERR, i.e., an error stream. If left alone, the null output would terminate all data retrieval activity.

At 220, in order to allow further data retrieval activity to continue with other external data sources 110(2), . . . , 110(N), the data transformer 146 converts the null output to a warning condition. By doing this, the data transformer has successfully terminated the data feed 104 but has avoided shutting down any other retrieval activities. Thus, the data transformer 146 allows no null output messages to reach STDERR.

At 230, the data transformer 146 redirects the error message to the warning log 148. It is through the warning log 148 that the data access module communicates with the user the fact that the data feed 104 was terminated. In some arrangements, the data transformer 146 saves the error message in the warning log 148 in an XML format.

Thus, through the above-described procedure, each data feed 104 generated by the data access module 144 executes standalone. Further, by terminating data feeds that produce no useful data, the GRC processing platform may run more efficiently. For example, suppose that a data feed 104 takes about 0.1 seconds to transform raw XML, 0.02 seconds to filter data, and 0.25 seconds to search keys in the applications 140 before any data updates are made. Then each data feed 104 termination saves 0.27 seconds.

Figure 3:
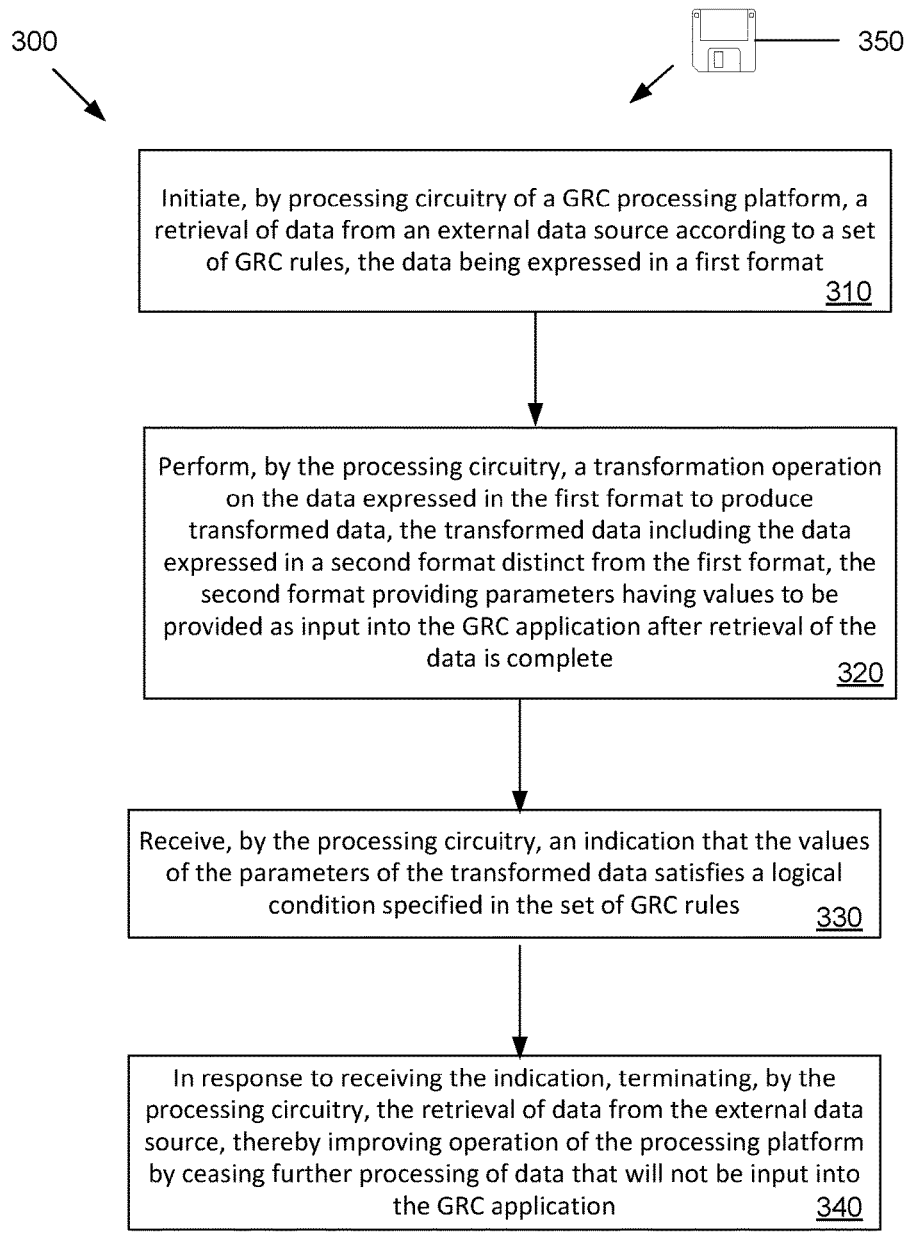
FIG. 3 is a flow chart illustrating an example method of processing the write requests within the electronic environment shown in FIG. 1.

FIG. 3 shows a method 300 of operating a GRC processing platform that runs a GRC application. The method 300 may be performed by the software constructs described in connection with FIG. 1, which reside in the memory 132 of the GRC processing platform 120 and are run by the processing units 124.

At 310, the GRC processing platform 120 obtains instructions to retrieve data from an external data source according to a set of GRC rules, the data being expressed in a first format at the external data source. In the above example, the data access module 144 forms a data feed 104 with an external data source, e.g., 110(1).

At 320, the data transformer 146 performs a transformation operation on the data stored in the first format at the external data source to produce transformed data, the transformed data including the data expressed in a second format distinct from the first format, the second format providing parameters having values to be provided as input into the GRC application after retrieval of the data is complete. In the example above, a parameter was the business unit and the logical condition was that there was at least one datum having a business unit value="accounting"

At 330, the data transformer 146 receives an indication that values of the parameters of the transformed data satisfy a logical condition specified in the set of GRC rules. In the example above, the data transformer 146 executes an XSL transform that determines whether any of the transformed data has a business unit value="accounting" and receives a negative answer.

At 340, in response to receiving the indication, the data access module 144 terminates the retrieval of data from the external data source, thereby improving operation of the processing platform.

Improved techniques of operating a GRC processing platform involves terminating retrieval activity in a data source when the data source indicates that there is no data to be obtained that satisfies a specified logical condition. In this way, the improved techniques allow a GRC processing platform to run more efficiently.

Having described certain embodiments, numerous alternate embodiments or variations can be made. For example, in some arrangements, the data transformer 146 may use an encoding other than an XSL transform to effect the termination of a data feed. In such a case, however, the data access module may cause multiple data feeds to be terminated.

In some arrangements, the GRC processing platform 120 is implemented by a set of cores or other types of control/processing circuitry running software. In such arrangements, the software instructions can be delivered, within the GRC processing platform 120, in the form of a computer program product 350. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of operating a governance, risk management, and compliance (GRC) processing platform that runs a GRC application, the method comprising:
   initiating, by processing circuitry of the GRC processing platform, a retrieval of data from an external data source according to a set of GRC rules, the data being expressed in a first format;
   performing, by the processing circuitry, a transformation operation on the data expressed in the first format to produce transformed data, the transformed data expressed in a second format distinct from the first format, the second format providing parameters having values to be provided as input into the GRC application after retrieval of the data is complete;
   receiving, by the processing circuitry, an indication that the values of the parameters of the transformed data satisfy a logical condition specified in the set of GRC rules;
   in response to receiving the indication, terminating, by the processing circuitry, the retrieval of data from the external data source thereby improving operation of the processing platform by ceasing further processing of data that will not be input into the GRC application; and
   retrieving data from other external data sources as the retrieval of data from the external data source is terminated,
   wherein receiving the indication includes receiving an error message indicating that the logical condition was satisfied, and
   wherein the method further comprises converting the error message to a warning so that further retrieval of data from other external data sources may occur.

2. A method as in claim 1, wherein initiating the retrieval of data includes obtaining instructions to receive the data from the external source are encoded as an Extensible Stylesheet Language (XSL) transformation,
   wherein the error message is a null output in the XSL, and
   wherein converting the error message to the warning includes applying an XSL transformation of the error message to produce the warning.

3. A method as in claim 2, wherein data from the external data source is formatted in a first XML style, and wherein performing the transformation operation includes transforming the data formatted in the first XML style to a second XML style using the XSL transformation.

4. A computer program product including a non-transitory, computer-readable storage medium which stores executable code, which when executed by a GRC processing platform that runs a GRC application, causes the GRC processing platform to perform a method of operating the GRC processing platform, the method comprising:
   initiating, by processing circuitry of the GRC processing platform, a retrieval of data from an external data source according to a set of GRC rules, the data being expressed in a first format;
   performing, by the processing circuitry, a transformation operation on the data expressed in the first format to produce transformed data, the transformed data expressed in a second format distinct from the first format, the second format providing parameters having values to be provided as input into the GRC application after retrieval of the data is complete;
   receiving, by the processing circuitry, an indication that the values of the parameters of the transformed data satisfy a logical condition specified in the set of GRC rules;
   in response to receiving the indication, terminating, by the processing circuitry, the retrieval of data from the external data source thereby improving operation of the processing platform by ceasing further processing of data that will not be input into the GRC application; and
   retrieving data from other external data sources as the retrieval of data from the external data source is terminated,
   wherein receiving the indication includes receiving an error message indicating that the logical condition was satisfied, and
   wherein the method further comprises converting the error message to a warning so that further retrieval of data from other external data sources may occur.

5. A computer program product as in claim 4, wherein initiating the retrieval of data includes obtaining instructions to receive the data from the external source are encoded as an Extensible Stylesheet Language (XSL) transformation,
   wherein the error message is a null output in the XSL, and
   wherein converting the error message to the warning includes applying an XSL transformation of the error message to produce the warning.

6. A computer program product as in claim 5, wherein data from the external data source is formatted in a first XML style, and wherein performing the transformation operation includes transforming the data formatted in the first XML style to a second XML style using the XSL transformation.

7. A GRC processing platform constructed and arranged to run a GRC application, the GRC processing platform including:
   a network interface:
   memory; and
   controlling circuitry couple to the memory, the controlling circuitry constructed and arranged to:
   initiate a retrieval of data from an external data source according to a set of GRC rules, the data being expressed in a first format;
   perform a transformation operation on the data expressed in the first format to produce transformed data, the transformed data expressed in a second format distinct from the first format, the second format providing parameters having values to be provided as input into the GRC application after retrieval of the data is complete;
   receive an indication that the values of the parameters of the transformed data satisfy a logical condition specified in the set of GRC rules;
   in response to receiving the indication, terminate the retrieval of data from the external data source, thereby improving operation of the processing platform by ceasing further processing of data that will not be input into the GRC application; and
   retrieve data from other external data sources as the retrieval of data from the external data source is terminated,
   wherein the controlling circuitry constructed and arranged to receive the indication is further constructed and arranged to receive an error message indicating that the logical condition was satisfied, and wherein the controlling circuitry is further constructed and arranged to convert the error message to a warning so that further retrieval of data from other external data sources may occur.

8. An electronic apparatus as in claim 7, wherein the controlling circuitry constructed and arranged to initiate the retrieval of data is further constructed and arranged to obtain instructions to receive the data from the external source are encoded as an Extensible Stylesheet Language (XSL) transformation, wherein the error message is a null output in the XSL, and wherein the controlling circuitry constructed and arranged to convert the error message to the warning is further constructed and arranged to apply an XSL transformation of the error message to produce the warning.

9. An electronic apparatus as in claim 8, wherein data from the external data source is formatted in a first XML style, and wherein the controlling circuitry constructed and arranged to perform the transformation operation is further constructed and arranged to transform the data formatted in the first XML style to a second XML style using the XSL transformation.

\* \* \* \* \*